United States Patent [19]

Endo et al.

[11] Patent Number: 5,777,027
[45] Date of Patent: Jul. 7, 1998

[54] CURABLE RESIN COMPOSITION WHICH COMPRISES A LACTONE-MODIFIED POLYVINYL ACETAL RESIN

[75] Inventors: Toshio Endo; Takaaki Fujiwa, both of Otake; Tomohisa Isobe, Iwakuni; Kazushi Watanabe, Otake, all of Japan

[73] Assignee: Daicel Chemical Industries, Ltd., Tokyo, Japan

[21] Appl. No.: 550,025

[22] Filed: Oct. 30, 1995

Related U.S. Application Data

[62] Division of Ser. No. 448,325, May 23, 1995, abandoned, which is a division of Ser. No. 319,452, Oct. 6, 1994, Pat. No. 5,574,098.

[30] Foreign Application Priority Data

| Oct. 7, 1993 | [JP] | Japan | 5-251887 |
| Jan. 10, 1994 | [JP] | Japan | 6-761 |
| Jan. 10, 1994 | [JP] | Japan | 6-764 |
| Aug. 1, 1994 | [JP] | Japan | 6-180333 |
| Sep. 12, 1994 | [JP] | Japan | 6-217564 |

[51] Int. Cl.$^6$ ..................... C08F 8/00
[52] U.S. Cl. ............ 525/58; 525/56; 525/57; 525/61; 525/360; 525/370; 525/374; 525/375; 525/383; 525/385; 525/386
[58] Field of Search ................. 525/61, 56, 57, 525/58, 360, 370, 374, 375, 383, 385, 386

[56] References Cited

U.S. PATENT DOCUMENTS

| 3,826,785 | 7/1974 | Bryant | 525/61 X |
| 3,931,068 | 1/1976 | Clendinning et al. | 525/61 X |
| 4,247,666 | 1/1981 | Mochizuki et al. | 525/61 X |
| 4,988,763 | 1/1991 | Kessler et al. | 525/61 |
| 5,171,784 | 12/1992 | Colon et al. | 525/61 X |

*Primary Examiner*—Judy M. Reddick
*Attorney, Agent, or Firm*—Morgan & Finnegan LLP

[57] ABSTRACT

A novel lactone-modified polyvinyl acetal resin and a novel carboxyl-modified resin thereof are disclosed. The novel resins of the present invention can be used as a polyol resin for coatings curable at ordinary temperatures or heating, adhesives, binders, a processing agent for fibers, a curable resin composition by mixing with a curing agent which can react to hydroxyl groups, and a composition for a magnetic recording medium, etc. The novel resins of the present invention have graft chains containing primary hydroxyl groups bonded to the ester group derived from a lactone compound, or the primary hydroxyl groups and carboxylic groups.

10 Claims, 4 Drawing Sheets

CURABLE RESIN COMPOSITION WHICH COMPRISES A LACTONE-MODIFIED POLYVINYL ACETAL RESIN

This is a divisional of application Ser. No. 08/448,325 filed May 23, 1995, now abandoned, which is a division of Ser. No. 08/319,452 filed Oct. 6, 1994 and now U.S. Pat. No. 5,574,098.

FIELD OF THE INVENTION

The present invention relates to a novel lactone-modified polyvinyl acetal resin in which the ring of a lactone compound is opened by hydroxyl groups in a polyvinyl acetal resin and a process for the preparation thereof.

The novel lactone-modified polyvinyl acetal resin of the present invention can be used as a polyol resin for coatings curable at ordinary temperatures or in heating, adhesives, binders, a processing agent for fibers, and a curable resin composition by mixing with a curing agent which can react with hydroxyl groups.

The novel lactone-modified polyvinyl acetal resin of the present invention has graft chains containing primary hydroxyl groups bonded to the ester group derived from a lactone compound.

Furthermore, the present invention relates to a novel curable resin composition which comprises the lactone-modified polyvinyl acetal resin and a compound having functional groups capable of reacting with hydroxyl groups.

Still further, the present invention relates to a composition for a magnetic recording medium which comprises (a) a lactone-modified polyvinyl acetal resin as set forth in claim 1, (b) a urethane prepolymer, (c) a polyisocyanate compound, (d) a powdered magnetic substance, and, optionally, (e) at least one selected from the group consisting of a polyester resin, an ethylene-vinyl acetate copolymer, a vinyl chloride resin having a plasticizer, and a vinyl chloride-vinyl acetate copolymer having a plasticizer.

Moreover, the present invention relates to a novel lactone-modified polyvinyl acetal resin having carboxylic groups at terminals of graft chains, a process for the preparation thereof, and a curable resin composition.

BACKGROUND OF THE INVENTION

A polyvinyl acetal resin is one of the thermoplastic resins which has been commercially used as a polyol resin for various coatings, adhesives, binders for powdered magnetic substances used for a magnetic recording media, a treatment agent for fibers, and an interlayer for multilayers glass used as windshields in cars, and which has the characteristics of an excellent resistance to light, transparency, dispersity in pigments, toughness, and adhesion.

However, its ductility, solubility, curability, compatibility, and thermoplasticity must be further improved. Furthermore, in the case when a polyvinyl acetal resin alone is used, it does not have sufficient thermoplasticity. Accordingly, it is generally used with a plasticizer.

Although polyvinyl acetal resin mixed with a plasticizer can provide a soft film, there are problems in that the plasticizer would move dispersively to other materials coming into contact with the film, resulting in the deterioration of desired properties, and further, its water resistance would become poor, depending upon the type of plasticizer, resulting in the limitation on its applications.

Still further, resins having a higher performance and a higher quality have been being recently searched for in response to requirements for energy saving, resource conservation, and variations or advances in use.

Regarding the coating field, various new types of resin have been proposed in response to the use of new coating types such as water-based coatings, highly solid coatings, powder coatings, electro-deposition coatings, photocurable coatings, elastic coatings, etc.

Conventional resins are not sufficient in quality for such a field.

Conventionally utilized resins have included alkyd resins, oil-free polyester resins, polyester polyols, polyether polyols, epoxy resins, and acrylpolyol resins as the resin for coatings curable at ordinary temperatures or in heating by mixing with a curing agent which can react with hydroxyl groups.

Resins have been used by mixing with a curing agent which can react to hydroxyl groups such as polyisocyanates, blocked polyisocyanates, melamine resins, phenol resins, epoxy resins, dialdehyde resins, and further, cellulosic resins such as cellulose nitrates, cellulose acetate-butylates, polyvinyl chloride resins, polyvinyl acetate resins, etc., and pigments solvents, additives, etc. to obtain coating compositions in various uses.

Of the resins having hydroxyl groups, alkyd resins have secondary hydroxyl groups which are poor in reactivity to curing agents, and it is exceedingly difficult to increase the concentration and molecular weight of hydroxyl groups in the resins at the same time during preparation.

Furthermore, alkyd resins have disadvantages of being poor in water resistance and weatherability. Still further, although oil-free alkyd resins and polyester polyols are used for many urethane coatings because of their primary hydroxyl groups which are high in reactivity, they have the disadvantage of poor water resistance because of the ester bonds they contain. In addition, a quick drying property and rigid coating layers cannot be readily obtained in the oil-free alkyd resins and polyester polyols.

Polyether polyols, which are prepared by the ring-opening polymerization of propylene oxide or ethylene oxide with polyfunctional alcohols are also widely used in the fields of urethane foams and flooring materials, etc., in which water resistance is required. However, polyether polyols are almost never used in the coating field because of poor weatherability and heat resistance.

Recently, particularly, acrylpolyol resins, which are prepared by the radical copolymerization of a hydroxyalkyl (meth)acrylate such as 2-hydroxyethyl methacrylate with acrylates or styrene, are becoming more widely used for urethane coatings dried at ordinary temperatures or cured by baking, and melamine coatings cured by baking.

More specifically, acrylpolyol resins are used in coatings such as acryl urethane coatings for car body repair, baking coatings for electrical home appliances, metallic coatings for car bodies, coatings for the outside walls in buildings which require weatherability, resistance to chemicals, resistance to water, resistance to contamination, and high rigidity.

However, excellent coating layers cannot be obtained from the acrylpolyol resins, and hydroxyl groups can only partially react to curing agents because the hydroxyl groups connect in the vicinity of the main structure of acryl polyol resins.

Although oligomers having a high molecular weight derived from epibis type epoxy resins also have hydroxyl groups, they are secondary hydroxyl groups which are poor in reactivity. Furthermore, oligomers themselves are too rigid to use for coatings without a modification thereof.

Still further, for example, in the case where polyvinyl acetal resins are employed as binders for powdered magnetic substances used for a magnetic recording medium, although they are excellent in the dispersion of powdered magnetic substances, the resulting magnetic layers are insufficient in flexibility, resulting in the causing of curling during storage and being abraded by tape guides and magnetic heads during recording or playback.

For the purpose of solving the above-mentioned disadvantages, and as a result of an intensive investigation, the inventors of this invention have now found that it is possible to solve the above problems by introducing lactone units into a polyvinyl acetal resin.

SUMMARY OF THE INVENTION

It is an object of the present invention to provide a modified polyvinyl acetal resin having improved flexibility, solubility, curability, compatibility, and thermoplasticity.

A first aspect oft he present invention relates to a lactone-modified polyvinyl acetal resin represented by the following general formula (I).

wherein the molar ratio l/m/n is from 81.6 to 50 mol %/ from 0 to 10 mol %/from 10 to 50 mol %, y is an integer ranging from more than 0 to 50, R is any one of hydrogen, a methyl group, and a propyl group, and X is a structural unit derived from the ring-opening reaction of a lactone compound which is represented by wherein q is an integer ranging from 4 to 8, and $R^a$ and $R^b$ is each an independent hydrogen atom or a methyl group.

A second aspect of the present invention relates to a process for the preparation of a lactone-modified polyvinyl acetal resin in the first aspect which comprises the reaction of a polyvinyl acetal resin represented by the following general formula (II).

in the formula (II), the molar ratio l/m/n is from 81.5 to 50%/from 0 to 10%/from 10 to 50%, and R is any one of hydrogen, a methyl group, and a propyl group, with a lactone compound.

A third aspect oft he present invention relates to a curable resin composition which comprises (a) a lactone-modified polyvinyl acetal resin and (b) a compound having functional groups capable of reacting with hydroxyl groups.

A fourth aspect of the present invention relates to a composition for a magnetic recording medium which comprises (a) a lactone-modified polyvinyl acetal resin as set forth in claim 1, (b) a urethane propolymer, (c) a polyisocyanate compound, (d) a powdered magnetic substance, and, optionally, (e) at least one selected from the group consisting of polyester resins, ethylene-vinyl acetate copolymers, vinyl chloride resins having a plasticizer, and vinyl chloride-vinyl acetate copolymers having a plasticizer.

A fifth aspect of the present invention relates to a lactone-modified polyvinyl acetal resin having carboxylic groups represented by the following general formula (III).

wherein the molar ratio l/m/n is from 81.5 to 50%/from 0 to 10%/from 10 to 50%, y is an integer ranging from more than 0 to 50, R is any one of hydrogen, a methyl group, and a propyl group, and X is a structural unit derived from the ring-opening reaction of a lactone compound represented by the following formula.

wherein q is an integer ranging from 4 to 8, $R^a$ and $R^b$ is each an independent hydrogen atom or a methyl group, and Z represents the following structural unit;

or hydrogen atom, wherein Q is a residual aliphatic hydrocarbon group having a carbon number of 2 to 12, a residua alicyclic hydrocarbon group having a carbon number of 6 to 7, or a residual aromatic hydrocarbon group having a carbon number of 6 which may or may not have substituted groups A sixth aspect of the present invention relates to a process for the preparation of a lactone-modified polyvinyl aceta resin having carboxylic groups in the fifth aspect whicl comprises the reaction of a lactone-modified polyviny acetal resin in the first aspect with an organic acid anhydride A seventh aspect of the present invention relates to curable resin composition which comprises (a) a lactone modified polyvinyl acetal resin having carboxylic group and (b) a compound having functional groups capable o reacting with hydroxyl groups.

DETAILED DESCRIPTION OF THE INVENTION

The present invention will be described hereinafter in more detail.

According to a first aspect of the present invention, there is provided a lactone-modified polyvinyl acetal resin represented by the general formula (I), wherein the molar ratio l/m/n is from 81.5 to 50%/from 0 to 10%/from 10 to 50%, y is an integer ranging from more than 0 to 50, R is any one of hydrogen, a methyl group, and a propyl group, and X is a structural unit derived from the ring-opening reaction of a lactone compound which represents wherein q is an integer ranging from 4 to 8, and $R^a$ and $R^b$ is each an independent hydrogen atom or a methyl group.

According to a second aspect of the present invention, there is provided a process for the preparation of a lactone-modified polyvinyl acetal resin represented by the above-mentioned formula (I) which comprises the reaction of a polyvinyl acetal resin represented by the general formula (II) described hereinafter with a lactone compound.

The lactone-modified polyvinyl acetal resin of the present invention can be prepared by the ring-opening reaction of a lactone compound with the polyvinyl acetal resin represented by the general formula (II).

wherein the molar ratio l/m/n is from 81.5 to 50%/ from 0 to 10%/from 10 to 50%, respectively, and R is any one of hydrogen, a methyl group and a propyl group, with a lactone compound.

In the general formula (II), in the case when R is a propyl group (—$C_3H_7$), the compound is designated as a polyvinyl butylal resin which is a preferred starting material.

For example, there are preferably exemplified Eslek BM-S, BL-S, BL-1, BH-S, BX series manufactured by Sekisui Kagaku Kogyo, Ltd. and Denka butylal #3000 manufactured by Denki-kagaku Kogyl, Ltd., etc.

The reaction is carried out in an amount ratio ranging from 5 to 60 parts by weight, preferably from 20 to 50 parts by weight, of the lactone compound, and from 40 to 95 parts by weight, preferably from 50 to 80 by weight, of the polyvinyl acetal resin.

In the case when the amount of lactone compound is less than 5 parts by weight, the lactone-modified polyvinyl acetal resin obtained is not still flexible, undesirably resulting in the incapability to be modified in compatibility with other resins for coatings or solubility in various solvents.

On the contrary, in the case when the amount of lactone compound exceeds 80 parts by weight, the lactone-modified polyvinyl acetal resin obtained becomes undesirably flexible and poor in solubility into solvents because of the crystallinity of the lactone chains.

It is to be noted that, in the case when the amount of lactone compound exceeds 60 parts by weight, a portion of the lactone compound is occasionally unable to react depending upon the reaction conditions, particularly the reaction temperature and reaction period of time, resulting in it remaining in the lactone-modified polyvinyl acetal resin produced. However, the remaining lactone compound may preferably act as a plasticizer for the lactone-modified polyvinyl acetal resin produced.

In the general formula (I), y represents mol amounts of the lactone compound introduced into one mol unit of the starting polyvinyl acetal resin employed, which is an integer ranging from more than 0 to 50. The average mole amounts range from 0.1 to 5, preferably from 0.5 to 2, and q is an integer ranging from 4 to 8, which depends upon the lactone compound to be employed.

$R^a$ and $R^b$ are each an independent hydrogen atom or a methyl group, respectively, which also depends upon the lactone compound to be employed.

For example, in the case of epsilon-caprolactone being employed as the starting lactone compound, both $R^a$ and $R^b$ are hydrogen.

Further, in the case of beta-methyl-delta-valerolactone being employed as the starting lactone compound, $R^a$ and $R^b$ are independently a methyl group or hydrogen, respectively. In addition, in the case when 3-methyl-caprolactone is used as a starting lactone compound, $R^a$ and $R^b$ are independently a methyl group and hydrogen, respectively.

That is, in the case of epsilon-caprolactone being used as a lactone compound, the unit X in the formula (I) is —O—$(CH_2)_5$—CO—, in the case of beta-methylgamma-valero-caprolactone being used as a lactone compound, the unit X in the formula (I) is in the case of 3,5,5-trimethylcaprolactone being employed as a lactone compound, the unit X in the formula (I) is in the case of 3,3,5-trimethylcaprolactone being employed as a lactone compound, the unit X in the formula (I) is The lactone compound can also be employed as a mixture composed of at least two types of lactones.

Furthermore, hydroxycaproic acid, which is a ring-opened product of caprolactone, can also be employed in place of lactone compounds.

If mixed lactones are employed, mixed lactone-derived ester-bonding units are randomly introduced into the starting polyvinyl acetal resin.

The starting polyvinyl acetal resin represented by the above-mentioned general formula (II) can be prepared by the reaction of an aldehyde with a polyvinyl alcohol which is prepared by the saponification of a polyvinyl acetate.

In the formulas (I) and (II), l, m, and n are from 81.0 to 50 mol %, from 0 to 10 mol % and from 10 to 50 mol %, respectively.

It has been shown by P. J. Flory that the value of 81.6 mol % (86.5 wt %) in l is the maximum value theoretically possible in the chemical structure.

The ring-opening reaction of a lactone compound to a polyvinyl acetal resin is preferably carried out under the conditions as described below.

The polyvinyl acetal resin is melted at more than 120° C. whereby water in the resin is removed, and then the lactone compound is charged.

The ring-opening reaction is carried out at temperatures ranging from 120° to 240° C., preferably 140° to 220° C., in the presence of catalysts in order to accelerate the ring opening reaction in a nitrogen atmosphere. In the case when the reaction temperature is below 120° C., the ring-opening reaction velocity of lactone compound is slow. In contrast, in the case when it exceeds 240° C., undesirable coloration or decomposition of the product occurs.

The reaction period ranges from 1 minute to 5 hours, preferably from 3 minutes to 2 hours, and more preferably from 5 to 30 minutes.

In the case when the reaction period is below 1 minute, the ring-opening reaction of the lactone compound does not proceed sufficiently.

In contrast, in the case when it exceeds 5 hours, the productivity becomes poor, resulting in increasing costs, and the undesirable coloration or decomposition of the product occurs.

Catalysts preferably include organic metal catalysts such as organic tin catalysts, organic aluminum catalysts, and organic titanate catalysts from the viewpoint of ready handling, lower toxicity, high selectivity in reaction, and lower color hue in products.

Specifically, there are exemplified alkali metals such as sodium or potassium, derivatives, thereof, tertiary amines such as pyridines, metal halides such as sttanous chloride, organic metal compounds such as sttanous octylate, monobutyl tin oxide, monobutyl tin tris(2-ethylhexanate), dibutyl tin oxide, dibutyl tin laurate, aluminum derivatives such as a water-based complex of triethyl aluminum, monoalkyl di(phenoxy) aluminum and alkoxy titanate compound typified by tetrabutyl titanate, and the like.

Catalysts are employed in an amount ranging from 0.005 to 0.5 parts, preferably ranging from 0.01 to 0.1 parts by weight.

In the case when it is below 0.001 parts by weight, the lactone compound cannot be sufficiently introduced into the polyvinyl acetal resin through the ring-opening reaction. In contrast, in the case when it exceeds 1 parts by weight, a resulting lactone-modified polyvinyl acetal resin is occasionally undesirable colored.

The ring-opening reaction can be carried out, for example, by a reactive compounding process using an extruder or a mixer such as a kneader type, screw type, agitator type, roll type, or static mixer type while melting. One or more oft he mixers may be preferably employed. Particularly, a screw extruder having single screw or twin screw and/or a static mixer type extruder are preferably employed.

In the above-mentioned extruder or mixer, an outlet for degassing may be preferably included in order to removed gases from the mixing zone.

Furthermore, an inlet for charging starting materials and additives may be also included through the mixing zone.

The static mixer extruder mentioned above is an apparatus equipped with a driveless element for mixing therethrough, and the molten mixture is transferred while being mixed passing through the drivenless element in the apparatus by pumping.

Examples of the static mixer extruder specifically include SMV or SMX manufactured by Sultzer Bros, Ltd., Etoflo mixing elements manufactured by Wymbs Engineering, Ltd., Ross elements manufactured by Transkem Plant, Ltd., Lightnin mixing elements manufactured by Lightnin Mixers and Aerators, Ltd., and a Sultzer type melting mixer manufactured by Sumitomo Heavy Industries, Ltd.

The reactive compounding process is also carried out at temperatures ranging from 120° to 240° C., preferably 140° to 220° C., in the presence of catalysts in order to accelerate the ring-opening reaction.

The starting polyvinyl acetal resin includes secondary hydroxyl groups derived from a vinyl alcohol moiety as shown in the general formula (I) described hereinabove. The lactone compound reacts to the hydroxyl groups, resulting in the production of flexible side chains containing lactone units. Secondary hydroxyl groups change to primary hydroxyl groups as the result oft he ring-opening reaction of the lactone compound.

However, the molar concentration of hydroxyl groups does not change in the total resin despite conversion from secondary hydroxyl groups to primary hydroxyl groups.

On carrying out the ring-opening reaction of a lactone compound to a polyvinyl acetal resin, water in the starting materials is preferably sufficiently removed, whereby preferably preventing the production of lactone homopolymer by-products.

According to a third aspect of the present invention, there is provided a curable resin composition which comprises (a a lactone-modified polyvinyl acetal resin represented by the above-mentioned general formula (I) and (b) a compoun having functional groups capable of reacting with hydroxy groups.

Examples oft he compound (b) having functional group capable of reacting with hydroxyl groups include an isocy anate compound such as isophorone diisocyanate, hexam ethylene diisocyanate, xylene diisocyanate, hydrogenate xylene diisocyanate, 4,4'-diphenylmethane diisocyanate 4,4'-methylenebis(cyclohexyldiisocyanate), adducts thereof oligomers thereof, blocked diisocyanates, prepolymers hav ing isocyanate groups, melamine resins such as an isobuty lated melamine, a n-butylated melamine, a butylated urea melamine resin and a methylated melamine, epoxy resin and dialdehyde compounds, etc.

In the curable resin composition of the present inventio1 the mixing ratio of the component (a) a lactone-modifie polyvinyl acetal resin with the compound (b) having func tional groups capable of reacting with hydroxyl group ranges from 95 to 40% be weight, preferably from 80 to 50 by weight.

In the case when it exceeds 95% by weight, the resultin resin would become unnecessarily rigid, and in contrast, i the case when it is below 40% by weight, the resulting resi would become unnecessarily flexible because of the increas in lactone chains, and the solubility of the resin into various solvents would become poor because of the crystallinity of the lactone chains.

As mentioned hereinabove, the lactone-modified polyvinyl acetal resin of the present invention has primary hydroxyl groups at terminals of side chains which are higher in reactivity with isocyanate compound and melamine resins.

Accordingly, the higher reactivity can be optionally adjusted by partial modification from hydroxyl groups to carboxylic groups.

The partial modification from hydroxyl groups to carboxylic groups can be attained by the reaction of hydroxyl groups with an organic polybasic anhydride, as mentioned hereinafter.

The moderate modification from hydroxyl groups to carboxylic groups would preferably contribute to an excellent ability to cling to the substrate to be coated.

In the curable resin composition of the present invention, the component (a) a lactone-modified polyvinyl acetal resin can be optionally employed together with alkyd resins, polyester polyols, acryl polyols, and epoxy resins, etc.

According to a fourth aspect of the present invention, there is provided a composition for a magnetic recording medium which comprises (a) a lactone-modified polyvinyl acetal resin as set forth in claim 1, (b) a urethane propolymer, (c) a polyisocyanate compound, (d) a powdered magnetic substance, and, optionally, (e) at least one selected from the group consisting of a polyester resin, an ethylene-vinyl acetate copolymer, a vinyl chloride resin having a plasticizer, and a vinyl chloride-vinyl acetate copolymer having a plasticizer.

The lactone-modified polyvinyl acetal resin is employed in an amount ranging from 40 to 95% by weight, preferably 50 to 80% by weight based on the total amount of the components (A), (b), and (c).

In the case when it exceeds 95% by weight, the resulting cured magnetic media may become too soft because of the flexibility of the lactone units at side chains and may become poor in dispersion of the powdered magnetic substances because of the crystallinity of units at side chains.

As the component (b) a urethane propolymer, specifically, there is preferably employed a urethane prepolymer having isocyanate groups at terminals and a molecular weight ranging from 1000 to 3000.

For example, Takenate L-1006, Takenate L-1007 , Takenate L-2710, and Takenate L-1007 manufactured by Takeda Chemicals, Ltd., Coronate #4048, Coronate #4090, and Coronate #4095 manufactured by Nihon Polyurethane Kogyo, Ltd. and Bandex P-538 and Bandex 305E manufactured by Dainjhon Ink, Ltd.

The component (c) includes Coronate L manufactured by Nihon-Polyurethane Kogyo, Ltd., Desmodule L manufactured by Baeyer, AG., and Takenate D102 manufactured by Takeda Chemicals, Ltd.

The component (c) is employed in an amount ranging from 1 to 20%, preferably from 5 to 15% by weight based on the total amount of the components (b) and (c).

In the case when it exceeds 10% by weight, cross-linking density in the cured magnetic layer obtained may become too high, resulting in the magnetic layer becoming undesirably rigid and brittle.

In contrast, in the case when it is below 1% by weight, cross-linking density in the cured magnetic layer obtained would become too low, resulting in the cured magnetic layer becoming undesirably adhesive.

The component (d) is employed in an amount of ranging from 70 to 95% by weight, preferably 80% by weight or so based on the total amount of the composition.

In the case when it exceeds 95% by weight, the cured magnetic layer obtained would become too rigid or brittle. In contrast, in the case when it is below 30% by weight, the cured magnetic layer obtained would become too soft and poor in abrasion resistance. Examples of the preferred powdered magnetic substances include gamma-FeO, gamma-Fe$_2$O$_3$, FeO, Fe$_3$O$_4$, Co-mixed gamma-FeO, Co-mixed gamma-Fe$_2$O$_3$, Co-mixed gamma-Fe$_3$O$_4$, chromium dioxide, and barium-ferrite.

The preferred particle size of the powdered magnetic substances is less than 1 micron, preferably less than 0.5 microns.

Optional component (e) includes a polyester resin, an ethylene-vinyl acetate copolymer, a vinyl chloride resin having a plasticizer, and a vinyl chloride-vinyl acetate copolymer having a plasticizer which are conventionally used.

The optional component (e) is employed in an amount ranging from 0 to 80%, preferably from 20 to 60% by weight based on the total amount of the composition. In the case when it exceeds 80% by weight, the cured magnetic layer obtained would become not flexible.

According to a fifth aspect of the present invention, there is provided a lactone-modified polyvinyl acetal resin having carboxylic groups represented by the following general formula (III).

wherein the molar ratio l/m/n is from 81.5 to 50%/from 0 to 10%/from 10 to 50%, respectively, y is an integer ranging from more than 0 to 50, R is any one of hydrogen, a methyl group, and a propyl group, and X is a structural unit derived from the ring-opening reaction of a lactone compound represented by the following formula, wherein q is an integer ranging from 4 to 8, $R^a$ and $R^b$ is each an independent hydrogen atom or a methyl group, and a structural unit:

or hydrogen atom, wherein Q is a residual aliphatic hydrocarbon group having a carbon number of 2 to 12, a residual alicyclic hydrocarbon group having a carbon number of 6 to 7, or a residual aromatic hydrocarbon group having a carbon number of 6 which may or may not have substituted groups.

According to a sixth aspect of the present invention, there is provided a process for the preparation of the lactone-modified polyvinyl acetal resin having carboxylic groups which comprises the reaction of the above-mentioned lactone-modified polyvinyl acetal resin represented by the general formula (1) with an organic acid anhydride represented by the following general formula (IV).

(IV)

wherein Q is the same as in the general formula (III).

In the general formula (III), l, m, n, and y must be the same as in the general formula (I).

The organic acid anhydride is employed in an amount of less than 10% by weight, preferably less than 5% by weight based on the lactone-modified polyvinyl acetal resin represented by the general formula (I).

In the case when it exceeds 10%, the resulting resin would become unpreferably viscous or there would occasionally be gelation in the modification.

Examples of organic polybasic anhydrides thereof include phthalic anhydride, maleic anhydride, succinic anhydride, tetrahydrophthalic anhydride, hexahydrophthalic anhydride, methyltetrahydrophthalic anhydride, methylhexahydrophthalic anhydride, and trimellitic anhydride, and the like.

In the reaction, one of the carboxylic groups is introduced by the ring-opening reaction of the carboxylic anhydride groups in the form of a half ester without dehydration.

The reaction is occasionally required in the case when an isocyanate compound having higher reactivity is employed in one-liquid type urethane coatings. It is to be noted that the pot life is an important factor, particularly in one-liquid type urethane coatings.

In the case when the modification from hydroxyl groups to carboxylic groups is more, the pot life in the one-liquid type urethane coatings would become longer.

The reaction is carried out in temperatures ranging from 80° to 150° C., preferably 100° to 120°0 C. Furthermore, the reaction is carried out in the absence or presence of catalysts.

The thus-obtained lactone-modified polyvinyl acetal resin and the lactone-modified polyvinyl acetal resin having carboxylic groups of the present invention can be also employed together with nitrocelluloses, polyvinyl chloride-vinyl acetate resins, and cellulose acetate-butylate resins as an additive for lacquer coatings which are not curing agents.

Still further, they can be also employed as a vehicle for inks.

The present invention is illustrated below by Synthesis Examples, Application Examples, and Application Comparative Examples.

EXAMPLE 1

(Preparation of a lactone-modified polyvinyl acetal resin)

A sufficiently dried reaction vessel equipped with a stirrer, a thermometer, a reflux regulator and a tube for supplying nitrogen gas was charged with 278.1 g of a butylal resin (Eslek BL-I manufactured by Sekisui Chemical Industries, Ltd. which has 3 mols of acetyl groups, 63 mols of butylal groups, and 34 mols of hydroxyl groups), 119.2 g of epsilon-caprolactone (molecular weight of 114.15) and 200 g of toluene, followed by being heated to 120° C. to carry out an azeotropic dehydration while recirculating toluene. After the completion of dehydration, the temperature was raised to 140° C. to remove toluene.

After the completion of removal, 7.95 mg of tin chloride ($SnCl_2$) was charged into the solution, followed by being heated to and maintained at 170° C. for 24 hours.

Successively, reactants were allowed to cool to 80° C. to complete the reaction and to obtain an epsilon-caprolactone-modified butylal resin.

0.55% by weight of epsilon-caprolactone remained in the resin.

It was confirmed by GPC analysis that the resin has a number average molecular weight of $2.0 + 10^4$ and a weight average molecular weight of $5.2 \times 10^4$ based on standard Polystyrene.

Figure 1:
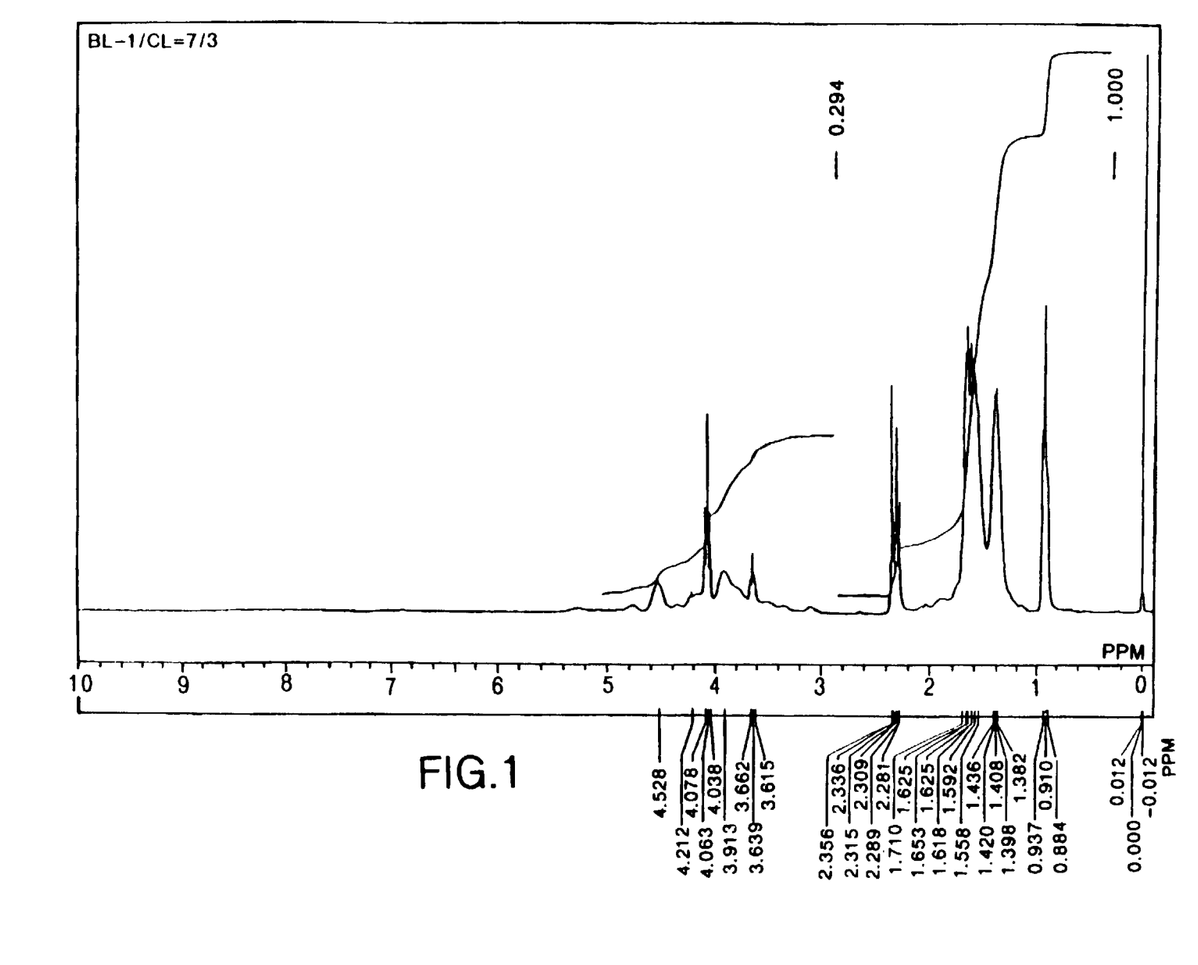
FIG. 1 is an $^1$H-NMR spectra chart and FIG. 2 is an II spectra chart related to the epsilon-caprolactone-modifie butylal resin obtained in Synthesis Example 1.

FIG. 1 shows an $^1$H-NMR spectra chart related to the epsilon-caprolactone-modified butylal resin. The NMR analysis was carried out in $CDCl_3$ with a JNM-EX270 analyzer manufactured by Nihon Denshi, Ltd.

It was confirmed that each proton in polyester parts derived from the ring-opening polymerization of epsilon-caprolactone was assigned as follows:

| ($^1$H-NMR spectra) | |
|---|---|
| delta 3.9–4.2 ppm | due to methylene proton connected to oxygen in ester bond |
| delta 2.1–2.5 ppm | due to methylene proton connected to carbonyl carbon in ester bond |
| delta 1.3–1.8 ppm | due to 6 methylene protons situated between the above-mentioned methylene groups |

Figure 2:
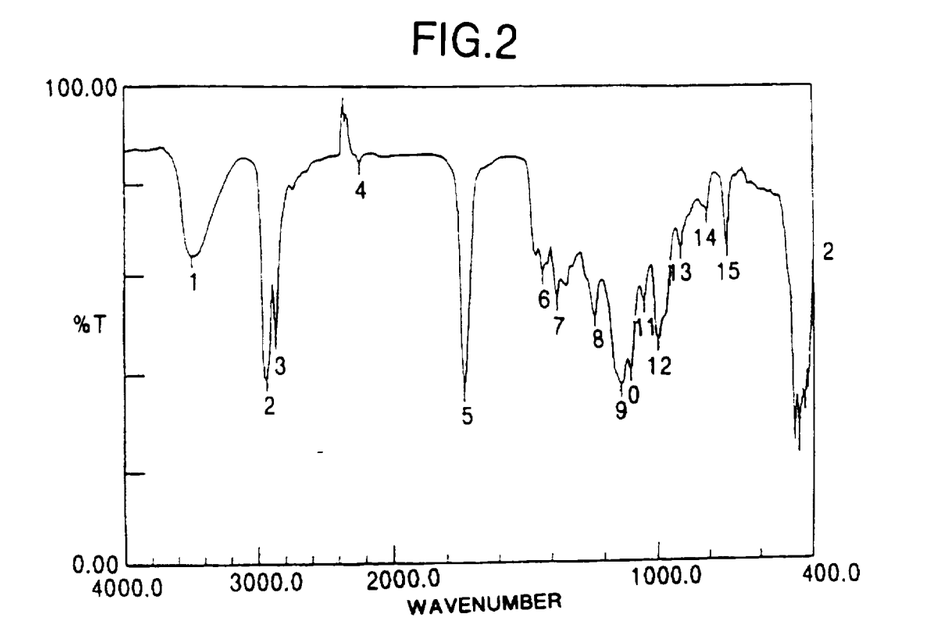

FIG. 2 shows an FT-IR spectra chart related to the caprolactone-modified butylal resin. The FT-IR analysis was carried out by a KBr method, with an FT-IR-5300 analyzer manufactured by Nihon Bunko Industries, Ltd. It was confirmed that each absorption in FIG. 2 as assigned as follows:

| (IR spectra) | |
|---|---|
| 3300–3600 $cm^{-1}$ | absorption due to O—H stretching vibration in hydroxyl groups |
| 2800–3000 $cm^{-1}$ | absorption due to C—H stretching vibration in methylene groups |
| 1733–1740 $cm^{-1}$ | absorption due to C=H stretching vibration in ester groups |
| the vicinity of 1050 $cm^{-1}$ | absorption due to C—O stretching vibration by saturated primary alcoholic hydroxyl groups |

Glass transition temperature (Tg) by a DSC analysis was 27° C.

Successively, toluene was charged into the crude epsilon-caprolactone-modified butylal resin to obtain a solution having a solid content of 50%. An acid value of 0.56 KOH mg/g, a hydroxyl value of 76.0 KOH mg/g, and a viscosity of 14800 cp (25° C.) in the solution were obtained.

The resin solution obtained was designated (A-1).

EXAMPLE 2

(Preparation of a lactone-modified polyvinyl acetal resin)

The same reaction vessel as used in Example 1 was charged with 210.4 g of a butylal resin (Eslek BL-S manufactured by Sekisui Chemical Industries, Ltd. which has 3 mols of acetyl groups, 72 mols of butylal groups, and 25 mols of hydroxyl groups), 90.2 g of epsilon-caprolactone and 150 g of toluene, followed by being heated to 120° C. to carry out an azeotropic dehydration while recirculating toluene. After the completion of dehydration, the temperature was raised to 140° C. to remove toluene.

After the completion of removal, 6.01 mg of tin chloride ($SnCl_2$) was charged into the solution, followed by being heated to and maintained at 170° C. for 7 hours, Successively, reactants were allowed to cool to 80° C. to complete the reaction and to obtain a crude caprolactone-modified butylal resin. 0.60% by weight of epsilon-caprolactone remained in the crude resin.

It was confirmed by GPC analysis that the resin has a number average molecular weight of $2.0 \times 10^4$ and a weight average molecular weight of $4.3 \times 10^4$ based on standard Polystyrene.

Figure 3:
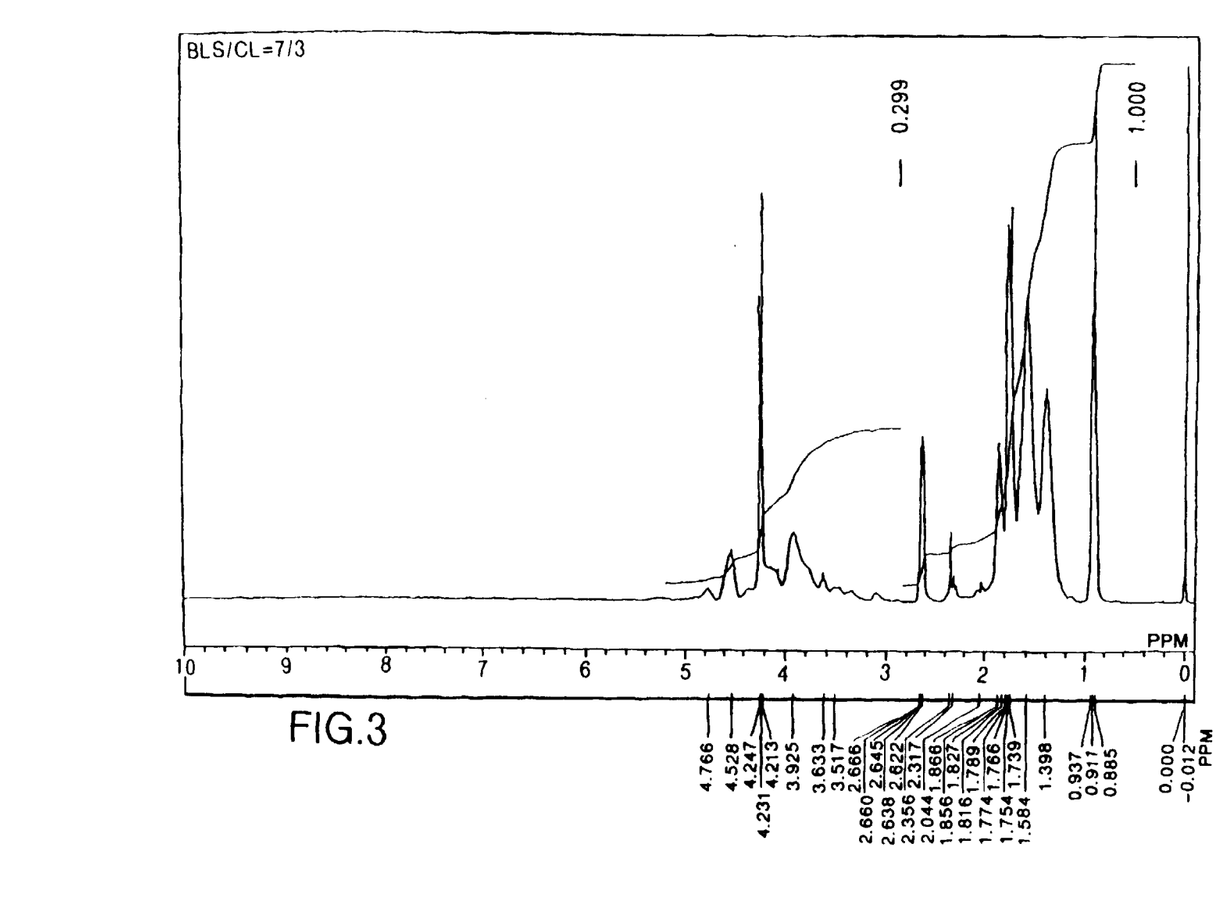
FIG. 3 is an $^1$H-NMR spectra chart and FIG. 4 is an II spectra chart related to the epsilon-caprolactone-modifie butylal resin obtained in Synthesis Example 2.

FIG. 3 exhibits $^1$H-NMR spectra chart related to the epsilon-caprolactone modified butylal resin.

It was confirmed that each proton in polyester parts derived from the ring opening polymerization of epsilon-caprolactone was assigned as follows.

| ($^1$H-NMR spectra) | |
|---|---|
| delta 3.9–4.2 ppm | due to methylene proton connected to oxygen in ester bond |
| delta 2.1–2.5 ppm | due to methylene proton connected to carbonyl carbon in ester bond |
| delta 1.3–1.8 ppm | due to 6 methylene protons situated between the above-mentioned methylene groups |

Figure 4:
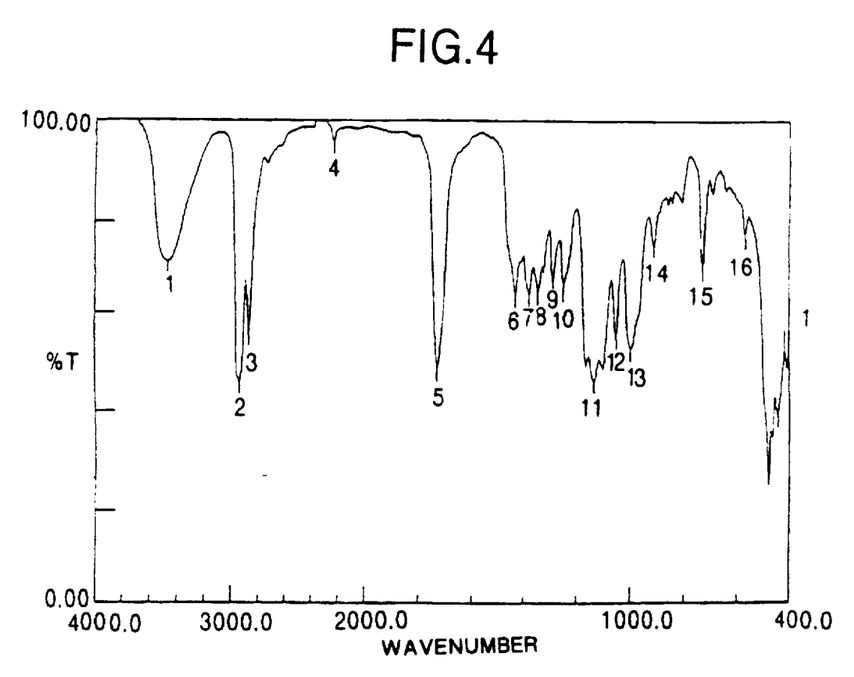

FIG. 4 shows an FT-IR spectra chart related to the epsilon-caprolactone-modified butylal resin. The FT-IR analysis was carried out by a KBr method. IT was confirmed that each absorption in FIG. 4 is assigned as follows.

| (IR spectra) | |
|---|---|
| 3300–3600 cm$^{-1}$ | absorption due to O—H stretching vibration in hydroxyl groups |
| 2800–3000 cm$^{-1}$ | absorption due to C—H stretching vibration in methylene groups |
| 1733–1740 cm$^{-1}$ | absorption due to C=H stretching vibration in ester groups |
| the vicinity of 1050 cm$^{-1}$ | absorption due to C—O stretching vibration by saturated primary alcoholic hydroxyl groups |

Grass transition temperature (Tg) measured by a DSC analysis was 9° C. Successively, toluene was charged into the crude epsilon-caprolactone-modified butylal resin to obtain a solution having a solid content of 50%.

An acid value of 0.09 KOH mg/g, a hydroxyl value of 50.7 KOH mg/g, and a viscosity of 10500 cp (25° C.) of the solution were obtained.

EXAMPLE 3

(Preparation of a lactone-modified polyvinyl acetal resin)

A 2 litre sufficiently dried reaction vessel equipped with a stirrer, a thermometer, a reflux regulator and a tube for supplying nitrogen gas was charged with 700.0 g of a butylal resin (Eslek BL-1), 300.0 g of epsilon-caprolactone and 500 g of toluene, followed by being heated to 120° C. to carry out an azeotropic dehydration while recirculating toluene. After the completion of dehydration, the temperature was raised to 140° C. to remove toluene.

After the completion of removal, 20 mg of tin chloride (SnCl$_2$) was charged into the solution, followed by being heated to and maintained at 170° C. for 3 hours. Successively, reactants were allowed to cool to 80° C. and to obtain a crude caprolactone-modified butylal resin solution while charging 500 g of toluene to adjust the solid content to approximately 50%.

1.0% by weight of epsilon-caprolactone remained in the crude resin.

A hydroxyl value of 54.3, an acid value of 0.2, and a viscosity of 25100 cp/25° C. of the crude resin were obtained.

EXAMPLE 4

(Preparation of a lactone-modified polyvinyl acetal resin)

The same procedures as described in Example 3 were repeated except that Eslek BL-S was employed and 0.69% by weight of epsilon-caprolactone was remained in the crude resin.

A hydroxyl value of 87.6, an acid value of 0.2 and a viscosity of 37500 cp/25° C. of the crude resin were obtained.

EXAMPLE 5

(Preparation of a lactone-modified polyvinyl acetal resin by the reaction compounding process)

35 g of a butylal resin (Eslek BM-S manufactured by Sekisui Chemical Industries, Ltd.), 13 g of epsilon-caprolactone and 0.02 g of monobutyl tin oxide as an organic metal catalyst were kneaded with a mixer (Labo-Plastomill Brabender manufactured by Toyo Seiki Seisakusyo, Ltd.) while heating at 160° C. for 10 minutes to obtain an epsilon-caprolactone-modified butylal resin.

The epsilon-caprolactone-modified butylal resin was allowed to rapidly cool after the completion of kneading, and number average molecular weight of the resin was measured by a GPC analysis to obtain the value of 52000 based on a standard Polystyrene whereas the starting butylal resin exhibited the value of 41000. it was confirmed by a gas chromatography analysis that approximately 8.0% by weight of unreacted epsilon-caprolactone was remained in the resin.

EXAMPLE 6

(Preparation of a lactone-modified polyvinyl acetal resin by the reactive compounding process)

40 g of a butylal resin (Eslek BX-3Z manufactured by Sekisui Chemical Industries, Ltd.), 40 g of epsilon-caprolactone and 0.08 g of monobutyl tin tris(2-ethylhexanate) as an organic metal catalyst were kneaded with the same mixer as used in Example 1 while heating at 180° C. for 10 minutes to obtain an epsilon-caprolactone-modified butylal resin.

The epsilon-caprolactone-modified butylal resin was allowed to rapidly cool after the completion of kneading. It was confirmed by a gas chromatography analysis that approximately 1.7% by weight of unreacted epsilon-caprolactone was remained in the resin.

EXAMPLE 7

(Preparation of a lactone-modified polyvinyl acetal resin having carboxylic groups)

A reaction vessel was charged with 200 parts by weight of the lactone-modified polyvinyl butylal resin obtained in Example, and 2.21 parts by weight of succinic anhydride, and maintained at 100° C. for 20 hours while stirring to obtain a lactone-modified polyvinyl butylal resin having carboxylic groups.

Toluene was charged into the resin to obtain a solution having a solid content of 50%. An acid value of 3.25 KOH mg/g, a hydroxyl value of 72.2 KOH mg/g and a viscosity of the solution of 20800 cp (25° C.) were obtained. The resin solution was designated (A-2).

EXAMPLE 8

(Preparation of a lactone-modified polyvinyl acetal resin having carboxylic groups)

A reaction vessel was charged with 200 parts by weight of the lactone-modified polyvinyl butylal resin obtained in Example and 2.25 parts by weight of succinic anhydride, and maintained at 100° C. for 20 hours while stirring to obtain a lactone-modified polyvinyl butylal resin having carboxylic groups.

Toluene was charged into the resin to obtain a solution having a solid content of 50%. An acid value of 2.25 KOH mg/g, a hydroxyl value of 48.2 KOH mg/g, and a viscosity of the solution of 16700 cp (25° C.) were obtained. The resin solution was designated (a-3).

Comparative Example 1

(Preparation of an acryl polyol having hydroxyl groups for reference)

30 parts by weight of styrene, 30 parts by weight of n-butylmethacrylate, 30 parts by weight of 2-ethylhexylacrylate, and 25 parts by weight of 2-hydroxethylacrylate were charged into 100 parts by weight of toluene to obtain a 50% solution containing a copolymer having a number average molecular weight of 1000 and a hydroxyl value of 60.0 KOH mg/g for reference. The copolymer solution was designated (A-4).

Application Examples 1, 2, and 3/Comparative Application Example 1

(Preparation of curable resin compositions and evaluations of cured layers)

140 parts of the above-mentioned solutions were mixed with 30 parts of Cymel 303 (hexamethoxy methylalmelamine manufactured by Mitsui Cyanamid, Ltd.), 1 parts of NACURE 5225 (Dodecyl benzene sulfonic acid neutralized by an amine/including an effective component of 25%, manufactured by King Industries, Inc.) and 0.01 part of Rainbow #3 (a silicone additive manufactured by Rainbow Chemical, Ltd.) while stirring, followed by charging Solvesso 100 to adjust the Fordcup No. 24 Viscosity to 25 seconds to obtain curable resin compositions.

The curable compositions obtained hereinabove were coated on steel plates having the thickness of 0.8 mm processed by zinc phosphate to obtain coated layers having a thickness of 20 microns, followed by baked at 170° C. for 20 minutes to obtain cured layers for evaluation of properties.

Results are shown in Table 1.

TABLE 1

|  | Application Example | | | Comparative Application Example |
|---|---|---|---|---|
|  | 1 | 2 | 3 | 1 |
| Resin No. | A-1 | A-2 | A-3 | A-4 |
| Appearance | good | good | good | good |
| 60-degree gloss | 102 | 102 | 102 | 102 |
| Pencil hardness | H | H | H | H |
| Acid resistance | NC | NC | NC | whitening |
| Water resistance | NC | NC | NC | slight decrease in gloss |
| Solvent resistance | NC | NC | NC | scratches |
| Abrasion resistance | NS | NS | NS | scratches |
| Gel fraction | 80 | 95 | 94 | 78 |

Appearance: Evaluated in relation to gloss feeling and heap feeling in the coated layers.

60-degree glass: Evaluated as a reflection ratio at 60-degrees.

Pencil hardness: Evaluated based on JIS K5400.

Acid resistance: Test pieces were dipped half way of the length into 40% sulfuric acid solution at 50° C. for 5 hours, followed by washing with water and observing the surface. NC means "no change."

Water resistance: Test piece was dipped into 40° C. water for 240 hours, followed by washing with water and observing the surface. NC means "no change".

Solvent resistance: Coating surface was rubbed with xylol-soaked gauze 10 times, followed by observing the surface. NC means "no change.")

Abrasion resistance: Test pieces were firmly fixed on the roof of a car with a sticking tape. The car was washed with a car washer 5 times, followed by observing the surface oft he test pieces. NS means "no scratches."

Gel fraction: The cured layer after weighing was dipped into acetone at 25° C. for 20 hours, and then the undissolved layer was weighted after drying at 110° C. for 1 hour, followed by calculating with the following equation. Larger number means more excellent curability.

$$\text{Gel fraction} = \frac{\text{undissolved coating layer weight}}{\text{coating layer weight before dipping}} \times 100(\%)$$

EXAMPLE 9

(Preparation of magnetic coating composition and magnetic tape therefrom)

A bowl mill was charged with 80 parts by weight of gamma-$Fe_2O_3$, 10 parts by weight of the lactone-modified polyvinyl butylal resin obtained in Example 1, 8 parts by weight of Coronate 4095 which is a urethane prepolymer, 2 parts by weight of Coronate L which is an isocyanate compound, and 100 parts by weight of a 1/1 mixed solvent composed of toluene and methylethyl ketone, followed by being mixed for 70 hours to prepare a magnetic coating composition.

The composition was coated on a polyester film having a thickness of 21 microns to prepare a coating layer having a thickness of 10 microns after drying, followed by calendaring the surface of the coating layer and slitting into a fixed width to prepare magnetic tape.

EXAMPLE 10

(Preparation of magnetic coating composition and magnetic tape therefrom)

The same procedures were repeated as described in Example 7, except that the lactone-modified polyvinyl butylal resin obtained in Example 1 was employed.

EXAMPLE 11

(Preparation of magnetic coating composition and magnetic tape therefrom)

A bowl mill was charged with 80 parts by weight of gamma-$Fe_2O_3$, 8 parts by weight of the lactone-modified polyvinyl butylal resin obtained in Example 1, 8 parts of Takenate L which is a urethane propolymer, 2 parts by weight of Coronate L, and 100 parts by weight of a 1/1 mixed solvent composed of toluene and methylethyl ketone, followed by being mixed for 70 hours to prepare a magnetic coating composition.

The same procedures as described in Example 7 were repeated to prepare magnetic tape.

Comparative Example 2

(Preparation of magnetic coating composition and magnetic tape therefrom)

The same procedures were repeated as described in Example 7, except that the polyvinyl butylal resin employed as a starting resin in Example 1 was employed together with 1 part of dioctyl phthalate as a plasticizer.

Application Example 4 and Comparative Application Example 2

(Evaluation of magnetic tape)

The signal-to-voice ratio (SN) and abrasion amount were measured in relation to the magnetic tapes obtained in Examples 7, 8, 9, and Comparative Example 2.

The results are shown in Table 2.

TABLE 2

|  | SN ratio | Abrasion amount | Heat resistance |
|---|---|---|---|
| Example 7 tape | 60 dB | 15 | no adhesion |
| Example 8 tape | 60 dB | 15 | no adhesion |
| Example 9 tape | 60 dB | 15 | no adhesion |
| Comparative Example 2 tape | 60 dB | 100 | adhesion |

The abrasion amount was measured as described below.

Respective magnetic tapes having a fixed length were abrasively moved at the speed of 76 cm/sec while bringing them into contact with a magnetic head in a tape recorder 300 times. It was compared to the Abrasion amount of 100 in the Comparative Example 2 tape.

Heat resistance was measured as described below.

Respective magnetic tapes having a fixed length were wound on to a glass tube at an extension of 1 kg, followed by maintenance at 60° C. and 80% RH for 24 hours and then maintaining at room temperature for 24 hours.

Then, tapes were unwound from the glass tube to observe the presence or absence of adhesion between tape layers.

While the invention has been described in detail and with reference to specific embodiments thereof, it will be apparent to one skilled in the art that various changes and modifications can be made therein without departing from the spirit and scope thereof.

What is claimed is:

1. A curable resin composition which comprises (a) a lactone-modified polyvinyl acetal resin represented by the following formula (I), wherein the molar ratio l/m/n is from 81.5 to 50% from 0 to 10%/from 10 to 50%, respectively, y is an integer ranging from more than 0 to 50, R is any one of hydrogen, a methyl group, and a propyl group, and X is a structural unit derived from the ring-opening reaction of a lactone compound represented by the following formula, wherein g is an integer ranging from 4 to 8, and $R^a$ and $R^b$ is each an independent hydrogen atom or a methyl group and (b) a compound having functional groups capable of reacting with hydroxyl groups.

2. A curable resin composition as set forth in claim 1, wherein said compound having functional groups capable of reacting with hydroxyl groups is at least one selected from the group consisting of a diisocyanate compound, an adduct thereof, a block compound thereof, a prepolymer having isocyanate groups, an isobutylated melamine, a n-butylated melamine, a methylated melamine, dialdehyde compound, and an epoxy resin.

3. A curable resin composition as set forth in claim 1, wherein said lactone-modified polyvinyl acetal resin is employed together with at least one selected from the group consisting of an alkyd resin, a polyester polyol resin, and an acryl polyol resin.

4. A curable resin composition as set forth in claim 1, wherein said lactone compound is epsilon-caprolactone.

5. A curable resin composition as set forth in claim 1, wherein said R in the formula (I) is a propyl group.

6. A curable resin composition according to claim 1, wherein the lactone-modified polyvinyl acetal resin is prepared by a process which comprises the reaction of a polyvinyl acetal resin represented by the following formula (II), wherein the molar ratio l/m/n is from 81.5 to Pb 50%/ from 0 to 10%/from 10 to 50%, respectively, R is any one of hydrogen, a methyl group and a propyl group, with a lactone compound.

7. A curable resin composition as set forth in claim 6, wherein said lactone compound is epsilon-caprolactone.

8. A curable resin composition as set forth in claim 6, wherein said R in the formula (I) is propyl group.

9. A curable resin composition as set forth in claim 6, wherein 40–95 part by weight of said polyvinyl acetal resin is allowed to react with 5–60 parts by weight of said lactone compound.

10. A curable resin composition as set forth in claim 6, wherein said polyvinyl acetal resin is allowed to react with said lactone compound in the presence of an organic metallic catalyst in a mixer while melting.

* * * * *